3,190,847
AGGLOMERATION AND CONCENTRATION
OF SYNTHETIC LATEX
Joseph M. Mitchell and David C. Chalmers, Sarnia, Ontario, Canada, assignors to Polymer Corporation Limited, Sarnia, Ontario, Canada
No Drawing. Filed Oct. 22, 1962, Ser. No. 232,268
Claims priority, application Canada, Dec. 2, 1961, 837,301
19 Claims. (Cl. 260—29.7)

This invention relates to a process for increasing the average particle size of synthetic latices to enable the latices to be concentrated to a higher solids concentration.

For many applications, particularly in the manufacture of latex foam rubber, a high solids, low viscosity latex is required. Such latices have heretofore been produced by a number of different methods, such as, polymerization directly to a high solids content; chemically agglomerating a preformed latex to increase its average particle size, e.g., blending with a salt or vegetable mucilage, and then concentrating to a high solids content by evaporating the water or by creaming; by freezing and thawing the preformed latex under controlled conditions to agglomerate the particles to a higher average particle size and then concentrating the thawed latex, etc. While these processes have been employed with varying degrees of success, alternate and simpler processes are deemed to be desirable to overcome the high viscosity, latex stability and cost problems variously characteristic of the prior processes.

It has now been discovered that the addition of a small amount of a polyurethane of limited water solubility to a synthetic latex will effect the desired agglomeration of the dispersed polymer particles in the latex. The thus treated latex is mechanically stable and can be concentrated to a higher solids content than is possible in the absence of such treatment.

A convenient method for classifying the adaptability of a synthetic latex to concentration is by measuring the percent solids obtained on concentrating the latex to a viscosity of 12 poise as measured at 25° C. on a Brookfield Model LVF Viscometer using the #3 spindle at 30 r.p.m. This value will hereinafter be referred to as the 12 poise solids or percent solids at 12 poise. Thus the dispersed polymer particles in a lower solids, relatively small average particle size latex may, by the process of this invention, be agglomerated to a larger average particle size and the latex concentrated to a higher solids at an equivalent low viscosity, i.e., to a higher 12 poise solids.

In carrying out the present invention, there is added to the synthetic latex 0.01–7.0 parts and preferably 0.05–1.0 part by weight of a urethane polymer per 100 parts by weight of original polymer solids in the latex. The polyurethane is preferably added with good agitation, in the form of an aqueous solution also containing a dissolved emulsifier which functions to limit the agglomeration. The latex may now be concentrated by the application of heat and/or vacuum to remove the required amount of water. Alternatively, the solution of urethane polymer may be added to a heated latex which may then be concentrated or allowed to stand in a quiescent or agitated state until the concentration step is undertaken. As is well known, synthetic latices are conventionally prepared by the polymerization, in aqueous media, of emulsified polymerizable monomers. Thus, it has been found that another alternative method of attaining the agglomerating effect is to add the solution of the polyurethane to the reactor in which the latex is being prepared, such addition being made prior to or after the initiation of the polymerization reaction.

The latices which may be agglomerated are of synthetic polymers which are rubbery or resinous in character. They may be prepared by the polymerization of vinylidene monomers in aqueous emulsion by methods which are well known in the art. For example, vinylidene monomers such as butadiene-1,3, 2-methyl butadiene-1,3, 2,3-dimethyl butadiene-1,3 and 1-methyl butadiene-1,3, each of which is herein considered to be "a butadiene-1,3," styrene, alpha-methyl styrene, para-methyl styrene, chlorostyrene, acrylonitrile, vinyl chloride, vinylidene chloride, vinyl pyridene, divinyl benzene, etc., may be homopolymized or copolymerized one with another to form rubbery or resinous polymers. Conventionally, these polymerizable monomers are emulsified in an aqueous medium by means of an emulsifying agent which can be one or more of a soap such as an alkali metal salt of a saturated or unsaturated carboxylic acid such as an alkali metal stearate, oleate, etc., or a rosin acid soap such as an alkali metal abietate or other suitable surface active agents such as the sodium or potassium salts of the condensation product of beta-naphthalene sulfonic acid and formaldehyde, alkali metal salts of alkyl aryl sulfonates, ethylene oxide condensates with alkyl phenols etc. The polymerization is made to take place by the addition of a suitable catalyst at suitably controlled temperatures. Peroxygen catalysts such as persulfates and hydroperoxides are usually employed and the polymerization temperature may vary from about 2–120° C. When the desired degree of polymerization is reached, the reaction is stopped. The unreacted monomers are then usually removed, although agglomeration is obtained with unstripped latex also. In the latter case the unreacted monomers will be removed with the water during concentration.

Latices prepared in this manner normally have a total solids content of about 15–45% by weight and particle sizes of about 400–1000 or more Angstroms. In the absence of the polyurethane, they may be concentrated to about 45–50% solids at 12 poise. The latices may be agglomerated individually or they may be blended before the agglomeration is carried out. In some cases up to 10 or more parts by weight of an oil are also added. After agglomeration, the particle sizes are increased by 50–1000% or more and the latices may be concentrated to as high as 70% or higher solids at 12 poise.

As is known, polyurethanes may be prepared by reacting organic poly-isocyanates with organic polyols containing 2–6 or more hydroxyl groups in the absence of water, although other active hydrogen containing compounds also may be used. The polyols most generally employed are polyethers and polyesters containing terminal hydroxyl groups. Polyalkylene ether glycols such as polyethylene ether glycols, polypropylene ether glycols, polytetramethylene ether glycol, polysymmetricaldimethylethylene ether glycol, etc., have been found suitable for preparing the polyether based urethanes. While a wide variety of aromatic and aliphatic polyisocyanates may be used, the aromatic di-isocyanates in which each of the two isocyanate groups is attached directly to an aromatic ring are preferred, because of their greater reactivity. Examples of such di-isocyanates are paraphenylene di-isocyanate, 2,4-toluene di-isocyanate, 2,6-toluene di-isocyanate, bi-toluene di-isocyanate, 1,5-naphthalene di-isocyanate, diphenyl methane di-isocyanate, dimethyl diphenyl methane di-isocyanate, phenyl isopropylidene diisocyanate etc. Catalysts are customarily employed to accelerate the reaction between the polyisocyanate and the polyhydroxy compounds. These are normally basic compounds such as triethylene diamine, dimethyl aniline, N-methyl morpholine, triethylamine etc. Non-amino catalysts include compounds such as tetra-n-butyltin, di-n-butyltin dilaurate, dimethyltin dichloride, etc. In many cases mixtures of these compounds will be advantageous in obtaining the desired reaction rates.

Although the materials employed for agglomerating the latex particles are polyurethanes, not all polyurethanes are equivalent in effectiveness. Suitable polyurethanes are those which are characterized by a solubility in water of 0.01–10.0 grams and preferably 0.1–3.0 grams per 100 grams of water at a temperature of 25° C. To obtain polyurethanes possessing such solubility characteristics the use of a molar excess of polyisocyanate over the polyol is required. For best results the molar ratio of polyol to polyisocyanate should fall within the range of 1:1 to 1:3. The preferred polyurethanes are prepared by reacting a polyalkylene ether glycol having a molecular weight of 1000–7000 and preferably 4000–7000 with one or more toluene di-isocyanate isomers in a molar ratio range of 1:1 to 1:3. The most preferred polyurethane is prepared by reacting polyethylene ether glycol having a molecular weight of 5500–6500 with one or more toluene diisocyanates in the molar ratio range of 1:1.5 to 1:2.5. While being effective in causing agglomeration of latex particles, there is some tendency towards coagulum formation when aqueous solutions of the polyurethanes are added to the latex. This may be overcome by the addition of a small amount, e.g., up to 3% or more, based on the polymer content, of extra emulsifier to the latex, the addition being made either directly to the latex or with the polyurethane solution. The addition of excessively large amounts of extra emulsifier is undesirable since it affects the foaming and gelling properties of the concentrated latex and changes in the compounding recipe are required to retain optimum properties in the foamed latex. The addition of potassium oleate or a sodium salt of the condensation product of betanaphthalene sulfonic acid with formaldehyde has been found to be particularly effective.

The following examples are given to illustrate the invention more fully.

*Example I*

A synthetic rubber latex was prepared by copolymerizing, in aqueous emulsion, 72 parts by weight of butadiene-1,3 with 28 parts by weight of styrene in the following recipe.

| Monomers: | Parts |
| --- | --- |
| Butadiene-1,3 | 72 |
| Styrene | 28 |
| Water | 130 |
| Emulsifier: | |
| Potassium oleate | 3.5 |
| Daxad 11 SPN [1] | 0.1 |
| $Na_3PO_4 \cdot 12H_2O$ | 0.40 |
| KCl | 0.40 |
| Modifier: | |
| Kalex acid [2] | 0.02 |
| $Na_2S_2O_4 \cdot 2H_2O$ | 0.02 |
| Tertiary dodecyl mercaptan | 0.03 |
| Catalyst: | |
| Di-isopropylbenzene hydroperoxide | 0.05 |
| Activator: | |
| $FeSO_4 \cdot 7H_2O$ | 0.002 |
| $Na_3PO_4 \cdot 12H_2O$ | 0.005 |
| Sodium formaldehyde sulfoxylate | 0.009 |
| Kalex acid | 0.004 |

[1] Sodium salt of beta-naphthalene sulfonic acid condensed with formaldehyde.
[2] Ethylenediamine tetraacetic acid.

The polymerization was carried out at about 7° C. When the conversion of monomers had reached 70%, the reaction was stopped by the addition of 0.075 part of sodium dimethyl dithiocarbamate and the unreacted monomers were stripped from the latex. The latex had a total solids content of 35.5% and a number average particle size of about 500 Angstroms while the polymer had a bound styrene content of 22%. When a sample of the latex was concentrated to a viscosity of 12 poise using a disc concentrator, it was found that the highest percent solids obtainable was 46.9 in the absence of any polyurethane agglomerant.

A urethane polymer was prepared by heating a polyethylene ether glycol having a molecular weight of 6000 to 100° C. along with a trace (about 0.00006 mole) of Dabco (triethylene diamine) catalyst, followed by the addition of 0.01 mole of toluene di-isocyanate (containing 65% 2,4-isomer) for each 0.005 mole of the glycol. The mixture was stirred well and held at 100° C. for one hour. The polyurethane produced was rubbery at temperatures above about 40° C. and resinous at room temperature. A 2% solution of the polyurethane was prepared by stirring a sample of the polymer with water for several days at room temperature.

1.0 part by weight of potassium oleate per 100 parts by weight of latex solids was added to a sample of the prepared latex, followed by the slow addition with good agitation of 0.10 part of the polyurethane in the form of the 2% solution in water. The latex now possessed a particle size of about 1600 Angstroms. It was then concentrated as previously noted and attained a concentration of 66.2% solids at a viscosity of 12 poise.

When the experiment was repeated employing 1.0, 1.0 and 1.5 parts of Daxad 15 instead of the potassium oleate—the Daxad 15 being added with 0.05, 0.10 and 0.15 part respectively of the polyurethane per 100 parts of the latex solids, the respective 12 poise solids obtained on concentrating the latex samples were 58.2%, 64.3% and 71.5%.

*Example II*

The agglomeration and concentration procedures of Example I were repeated with urethane polymers prepared as described below.

(a) An equimolar blend of polyethylene ether glycols having molecular weights of 1000 and 6000 was employed in preparing the polyurethane. 0.01 mole of the toluene di-isocyanate was used for each 0.01 mole of the glycol blend. The resulting urethane polymer had a solubility in water of somewhat more than 5 grams per 100 grams of water at 25° C. It was found that the addition of 0.50 gram of polyurethane per 100 grams of latex solids, in the absence of added emulsifier, permitted the latex to be concentrated to 62.5% solids at a viscosity of 12 poise.

(b) The procedure in (a) was repeated using an equimolar blend of polyethylene ether glycols having molecular weights of 1000 and 4000. The resulting urethane polymer had a solubility in water of somewhat more than 5 grams per 100 grams of water at 25° C., and the latex could be concentrated to 52.3% solids at 12 poise.

(c) The procedure in (a) was repeated using an equimolar blend of glycerol and polyethylene ether glycol having a molecular weight of 6000. The resulting urethane polymer had a solubility in water of somewhat more than 5 grams per 100 grams of water at 25° C., and the latex could be concentrated to 51.4% solids at 12 poise.

(d) A polyurethane was prepared employing equimolar portions of a polyethylene ether glycol of 1000 molecular weight and the toluene diisocyanate. The polymer had a solubility in water of somewhat more than 1.0 gram per 100 grams of water at 25° C. A portion of this solution was blended with a portion of the urethane polymer solution obtained in (a) so that the resulting solution contained equal amounts of each polymer. This solution was diluted to 1% solids and added to the latex in the amount of 1.0 part of urethane polymer blend per 100 parts of latex solids. The latex could be concentrated to 62.6% solids at 12 poise.

(e) A polyurethane was prepared by reacting the toluene diisocyanate with a polyethylene ether glycol having a molecular weight of 6000 in the mole ratio of 1.5/1. 0.21 and 6.7 parts of the polyurethane in the form 2% solutions in water were added to samples of a latex prepared as in Example I along with an additional 2.1 and 1.0 parts of Daxad 15 respectively. The latex had a total solids content of 34.6%. It was found that the latex samples could be concentrated to 69.0% and 51.0% solids at 12 poise, respectively.

*Example III*

The urethane polymer prepared in Example I was applied to the agglomeration and concentration of various latices.

(a) A rubbery oil-resistant polymer latex was prepared by copolymerizing 82 parts by weight of butadiene-1,3 with 18 parts by weight of acrylonitrile using the polymerization recipe given in Example I. The latex had a total solids content of 32.1%, a particle size of 450 Angstroms and it could be concentrated to 47.0% solids at 12 poise. When 0.10 part by weight of the polyurethane polymer was added to it in the form of a 2% solution along with 1.0 part of Daxad 15 per 100 parts by weight of latex solids, the number average particle size of the latex was increased to about 1500 Angstroms and it could be concentrated to 65.0% solids at 12 poise.

(b) A rubbery oil-resistant polymer latex was prepared by copolymerizing 65 parts by weight of butadiene-1,3 with 35 parts by weight of acrylonitrile in the polymerization recipe in Example I. The latex had a total solids content of 40.1% and could be concentrated to 46% solids at 12 poise. When 0.50 part by weight of the polyurethane polymer was added to it in the form of a 2% solution per 100 parts by weight of latex solids with no added emulsifier, the latex could be concentrated to 58.5% solids at 12 poise.

(c) A synthetic rubber latex was prepared by copolymerizing 50 parts by weight of butadiene-1,3 with 50 parts by weight of styrene in aqueous emulsion at a temperature of 65° C. using Dresinate S-208 (a potassium rosin acid soap) as emulsifier and potassium persulfate as catalyst. The latex had a total solids content of 43.9%, a particle size of 600 Angstroms and it could be concentrated to 50.2% solids at 12 poise. When 0.10 part by weight of the polyurethane polymer was added to it in the form of a 2% solution along with 0.50 part of Daxad 15 per 100 parts by weight of latex solids, the latex particle size was increased to 750 Angstroms and it could be concentrated to 56.0% solids at 12 poise.

(d) A synthetic resin latex was prepared by polymerizing styrene in aqueous emulsion. Potassium oleate was used as the emulsifier and potassium persulfate as the catalyst. The latex had a total solids content of 35.0%. Portions of this resin latex were blended with portions of the initial rubbery butadiene-1,3-styrene copolymer latex prepared in Example I, such that the blends contained 15.0 and 30.0 parts by weight of polystyrene per 100 parts by weight of total polymer in the respective blends. 0.15 part of polyurethane and 1.0 parts of Daxad 15 per 100 parts by weight of latex solids were added to each of the latex blends in the form of a 2% solution in water. The latex blends could now be concentrated to 65.3% and 58.8% solids at 12 poise, respectively.

*Example IV*

Several copolymerizations of butadiene-1,3 with styrene were carried out in the presence of various amounts of the urethane polymer prepared in Example I. It was found that the resulting latices could be concentrated to significantly higher percent solids at 12 poise than a similar latex prepared in the absence of the urethane polymer.

The polymerization recipes and the results obtained are summarized in the following table.

| | 1 | 2 | 3 | 4 |
|---|---|---|---|---|
| Butadiene-1,3 | 72 | 72 | 72 | 72 |
| Styrene | 28 | 28 | 28 | 28 |
| Water | 130 | 130 | 130 | 130 |
| KOH | 0.613 | 0.613 | 0.613 | 0.613 |
| Oleic acid | 3.085 | 3.085 | 3.085 | 3.085 |
| Daxad 11 | 0.10 | 0.10 | 1.0 | 1.0 |
| Na$_3$PO$_4$.12H$_2$O | 0.40 | 0.40 | 0.40 | 0.40 |
| KCl | 0.40 | 0.40 | 0.40 | 0.40 |
| Kalex acid | 0.02 | 0.02 | 0.02 | 0.02 |
| Na$_2$S$_2$O$_4$.2H$_2$O | 0.02 | 0.02 | 0.02 | 0.02 |
| Tertiary dodecyl mercaptan | 0.03 | 0.03 | 0.03 | 0.03 |
| Di-isopropylbenzene hydroperoxide | 0.05 | 0.05 | 0.05 | 0.05 |
| FeSO$_4$.7H$_2$O | 0.0025 | 0.0025 | 0.0038 | 0.0050 |
| Na$_3$PO$_4$.12H$_2$O | 0.010 | 0.010 | 0.015 | 0.020 |
| Sodium formaldehyde sulfoxylate | 0.010 | 0.010 | 0.015 | 0.020 |
| Kalex acid | 0.0031 | 0.0031 | 0.0047 | 0.0062 |
| Polyurethane | none | 0.10 | 0.05 | 0.10 |
| Sodium dimethyl dithiocarbamate | 0.10 | 0.10 | 0.10 | 0.10 |
| Reaction temperature, ° C | 9 | 9 | 9 | 9 |
| Percent solids at 12 poise | 47.0 | 59.8 | 69.0 | 63.0 |
| Weight percent coagulum | 0.10 | | 0.10 | 0.15 |

*Example V*

The polyurethane agglomerated latex concentrate of Example I which had been concentrated to 71.5% solids was compounded in the following recipe and made into foam rubber along with a sample of the original latex which had been freeze-agglomerated by the prior art method at −35° C. and concentrated to 66% solids. All parts are given as dry weight per 100 parts of dry latex solids.

| | Parts |
|---|---|
| Latex—(dry weight) | 100 |
| Pamak 45—(KOH saponified tall oil–frothing soap) | 1.0 |
| Cascaloid—(Casein-stabilizer) | 0.25 |
| Ethazate—(Zinc diethyl dithiocarbamate-accelerator) | 0.75 |
| OXAF—(Zinc-2-mercaptobenzothiazole-accelerator) | 1.0 |
| Sulfur—(Curing agent) | 2.25 |
| Trimene base—(reaction product of ethyl chloride, formaldehyde and ammonia-sensitizer) | 0.50 |
| Antioxidant | 0.75 |

After compounding in the above recipe, the latex samples were allowed to mature for 16 hours at room temperature. An additional 0.50 part of Pamak 45 and 0.25 part of Trimene base were added to each latex sample and the samples were diluted to 60% solids. 3.0 parts of zinc oxide in the form of an aqueous dispersion and 2.3 parts of sodium silicofluoride also in the form of an aqueous dispersion were blended into each sample and the samples were then whipped into a foam. The foams were poured into molds, covered and cured for 25 minutes in an open steam oven at 100° C. After removal from the molds, the foam rubber samples were washed with water, dried and tested for physical properties.

The results are summarized in the following table.

| Concentrated Latex | Freeze Agglomerated | Polyurethane Agglomerated |
|---|---|---|
| Tensile Strength (p.s.i., calculated at density of 6.25 lbs./cu. ft.) | 5.1 | 4.1 |
| Elongation, percent | 155 | 163 |
| Compression Set, percent | 8.1 | 6.8 |
| Volume Shrinkage, percent | 15.9 | 15.2 |
| Hot Tear Resistance (p.s.i. at 4.7 density) | 1.5 | 2.0 |
| Appearance | Good | Good |

What is claimed is:

1. The process for agglomerating the particles of an aqueous latex containing a rubbery polymer of a butadiene-1,3 monomer to provide an aqueous latex of the thus agglomerated particles, the process comprising dispersing a crosslinked polyurethane in said latex whereby to agglomerate the latex particles and thus permit the latex to be concentrated to a higher degree at equivalent viscosity than is possible in the absence of such polyurethane, said polyurethane being added in amount of from about 0.01 to about 7.0 parts by weight per 100 parts by weight of the polymer solids in the latex and being characterized by a solubility in water at 25° C. of from about 0.01 to about 10.0 grams per 100 grams of water.

2. The process of claim 1 wherein said polurethane is dispersed in the latex by its addition in the form of an aqueous solution.

3. The process of claim 2 wherein said polyurethane is added in the presence of additional emulsifier.

4. The process of claim 3 wherein said additional emulsifier is selected from the group consisting of potassium oleate and the sodium salt of the condensation product of beta-naphthalene sulfonic acid with formaldehyde.

5. The process of claim 1 in which said latex is concentrated by the removal of water therefrom whilst said polyurethane is present therein in a dispersed form.

6. The process of claim 2 wherein said crosslinked polyurethane is prepared by reacting an aromatic di-isocyanate with a polyalkylene ether glycol selected from the group consisting of polyethylene ether glycol and polypropylene ether glycol in the proportion of from about 1 to about 3 moles of di-isocyanate per mole of glycol, said glycol having a molecular weight of from about 1000 to about 7000, said crosslinked polyurethane being added in amount of from about 0.05 to about 1.0 part by weight per 100 parts by weight of the polymer solids in the latex and being characterized by a solubility in water at 25° C. of from about 0.1 to about 3.0 grams per 100 grams of water.

7. The process of claim 2 wherein said crosslinked polyurethane is prepared by reacting a toluene di-isocyanate with a polyethylene ether glycol having a molecular weight of from about 5500 to about 6500 in the proportion of from about 1.5 to about 2.5 moles of di-isocyanate per mole of glycol, said crosslinked polyurethane being added in amount of from about 0.05 to about 1.0 part by weight per 100 parts by weight of the polymer solids in the latex and being characterized by a solubility in water at 25° C. of from about 0.1 to about 3.0 grams per 100 grams of water.

8. The process of claim 2 wherein said polurethane is added in the presence of from about 0 to about 3.0 parts by weight per 100 parts of latex polymer of additional emulsifier.

9. The process of claim 8 wherein said additional emulsifier is selected from the group consisting of potassium oleate and the sodium salt of the condensation product of beta-napthalene sulfonic acid with formaldehyde.

10. The process of claim 8 in which said latex is concentrated by the removal of water therefrom whilst said polyurethane is present therein in a dispersed form.

11. The process of claim 8 wherein said latex is a latex of a rubbery copolymer of butadiene-1,3 with styrene containing from about 15 to about 45% total solids, said crosslinked polyurethane is prepared by reacting a toluene di-isocyanate with a polyethylene ether glycol having a molecular weight of from about 5500 to about 6500 in the proportion of from about 1.5 to about 2.5 moles of the di-isocyanate per mole of glycol, said crosslinked polyurethane being added in amount of from about 0.05 to about 1.0 part by weight per 100 parts by weight of said rubbery copolymer of butadiene-1,3 with styrene and being characterized by a solubility in water at 25° C. of from about 0.1 to about 3.0 grams per 100 grams of water.

12. The process of claim 8 wherein said latex is a latex of a rubbery copolymer of butadiene-1,3 with acrylonitrile containing from about 15 to about 45% total solids, said crosslinked polyurethane is prepared by reacting a toluene di-isocyanate with a polyethylene ether glycol having a molecular weight of from about 5500 to about 6500 in the proportion of from about 1.5 to about 2.5 moles of the di-isocyanate per mole of glycol, said crosslinked polyurethane being added in amount of from about 0.05 to about 1.0 part by weight per 100 parts by weight of said rubbery copolymer of butadiene-1,3 with acrylonitrile and being characterized by a solubility in water at 25° C. of from about 0.1 to about 3.0 grams per 100 grams of water.

13. The process of claim 8 wherein said latex is a blend of a latex of a rubbery copolymer of butadiene-1,3 with styrene containing from about 15 to about 45% total solids with a latex of a resinous homopolymer of styrene containing from about 15 to about 45% total solids, said crosslinked polyurethane is prepared by reacting a toluene di-isocyanate with a polyethylene ether glycol having a molecular weight of from about 5500 to about 6500 in the proportion of from about 1.5 to about 2.5 moles of the di-isocyanate per mole of glycol, said crosslinked polyurethane being added in amount of from about 0.05 to about 1.0 part by weight per 100 parts by weight of rubbery copolymer plus resinous homopolymer in the original latex blend and being characterized by a solubility in water at 25° C. of from about 0.1 to about 3.0 grams per 100 grams of water.

14. The process for agglomerating the particles of an aqueous latex containing a rubbery polymer of a butadiene-1,3 monomer to provide an aqueous latex of the thus agglomerated particles, which process comprises polymerizing the monomer in an aqueous emulsion system in the presence of a crosslinked polyurethane dispersed therein to the extent of from about 0.01 to about 7.0 parts by weight per 100 parts by weight of the rubbery polymer obtained in said latex, said polyurethane being characterized by a solubility in water at 250° C. of from about 0.01 to about 10.0 grams per 100 grams of water.

15. The process of claim 14 in which said latex is subsequently concentrated by the removal of water therefrom.

16. The process of claim 14 wherein said polyurethane is present in said aqueous emulsion polymerization system in amount of from about 0.05 to about 1.0 part by weight per 100 parts by weight of the rubbery polymer obtained in the resulting latex.

17. The process of claim 16 wherein said rubbery polymer is a copolymer of butadiene-1,3 with styrene.

18. The process of claim 14 wherein said polyurethane is prepared by reacting an aromatic di-isocyanate with a polyethylene ether glycol having a molecular weight of from about 1000 to about 7000 in the proportion of from about 1 to about 3 moles of di-isocyanate per mole of glycol.

19. The process of claim 14 wherein said polyurethane is prepared by reacting a toluene di-isocyanate with a polyethylene ether glycol having a molecular weight of from about 5500 to about 6500 in the proportion of from about 1.5 to about 2.5 moles of di-isocyanate per mole of glycol and is characterized by a solubility in water at 25° C. of from about 0.1 to about 3.0 grams per 100 grams of water and wherein the latex contains from about 15 to about 45% total solids.

References Cited by the Examiner

UNITED STATES PATENTS

| | | | |
|---|---|---|---|
| 1,864,078 | 6/32 | Luther et al. | 260—29.7 |
| 2,853,472 | 9/58 | Schroeder et al. | 260—859 |
| 2,993,013 | 7/61 | Wolfe | 260—2.5 |

MURRAY TILLMAN, *Primary Examiner.*

LOUISE P. QUAST, *Examiner.*